(12) United States Patent
Borsato et al.

(10) Patent No.: US 6,654,891 B1
(45) Date of Patent: Nov. 25, 2003

(54) TRUSTED NETWORK BINDING USING LDAP (LIGHTWEIGHT DIRECTORY ACCESS PROTOCOL)

(75) Inventors: Larry W. Borsato, Ottawa (CA); Mark Gaudet, Ottawa (CA); Ian Hamilton, Nepean (CA); Rod Anderson, Carp (CA); Glenn Waters, Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/182,944

(22) Filed: Oct. 29, 1998

(51) Int. Cl.$^7$ ................................................ H04L 12/66
(52) U.S. Cl. ....................... 713/201; 713/200; 370/352; 370/242
(58) Field of Search ................................ 713/200, 201; 370/352

(56) References Cited

U.S. PATENT DOCUMENTS

| | | | |
|---|---|---|---|
| 5,553,234 A | | 9/1996 | Cotner et al. |
| 5,689,633 A | | 11/1997 | Cotner et al. |
| 5,768,519 A | * | 6/1998 | Swift et al. |
| 5,790,677 A | * | 8/1998 | Fox et al. |
| 5,812,819 A | | 9/1998 | Rodwin et al. |
| 5,850,442 A | * | 12/1998 | Muftic |
| 5,884,024 A | | 3/1999 | Lim et al. |
| 5,923,756 A | * | 7/1999 | Shambroom |
| 6,006,018 A | * | 12/1999 | Burnett et al. |
| 6,009,103 A | | 12/1999 | Woundy |
| 6,023,464 A | * | 2/2000 | Woundy |
| 6,026,445 A | | 2/2000 | Kephart et al. |
| 6,070,242 A | | 5/2000 | Wong et al. |
| 6,131,164 A | | 10/2000 | Parker |
| 6,351,536 B1 | | 2/2002 | Sasaki |
| 6,460,141 B1 | | 10/2002 | Olden |

OTHER PUBLICATIONS

M. Wahl, "A Summary of the X.500(96) User Schema for use with LDAPv3", Dec. 1, 1997. pp. 1–38.
M. Wahl, et al., "Lightweight Directory Access Protocol (v3)", Dec. 1997, 59 pages.
R. Droms, "Authentication for DHCP Messages", Nov. 1996, 10 pages.
P. Vixie, et al. Dynamic Updates in the Domain Name System (DNS Update), Apr. 1997.

* cited by examiner

*Primary Examiner*—Ly V. Hua
(74) *Attorney, Agent, or Firm*—Blakely Sokoloff Taylor & Zafman LLP

(57) ABSTRACT

A method and apparatus for providing information between a central database and at least one server. A server manager is coupled between the central database and the at least one server. The server manager communicates configuration information between the central database and the at least one server in a single communication channel.

7 Claims, 9 Drawing Sheets

TRUSTED NETWORK BINDING USING LDAP (LIGHTWEIGHT DIRECTORY ACCESS PROTOCOL)

BACKGROUND OF THE INVENTION

1. Field of the Invention

The present invention relates in general to information networking and more particulary to transmitting configuration information between a central database and one or more servers in a network.

2. Description of the Related Art

In a typical network, a server directly communicates with the central database in order to obtain configuration information. FIG. 1 illustrates an overall diagram of a conventional Transmission Control Protocol (TCP)/Internet Protocol (IP) network 101 including one or more Domain Name Service (DNS) servers 102A–N, one or more Dynamic Host Configuration Protocol (DHCP) servers 103A–N and a central database 104. Typically, the one or more DNS servers 102A–N and DHCP servers 103A–N on the network transmit requests for configuration information and send configuration updates to the central database 104. The central database 104 either transmits the requested configuration information back to each server or it stores the configuration updates received from each server.

In the past, organizations relied on paper based methods of managing IP addresses in a network. DHCP simplified the management and assignment of IP addresses to clients by eliminating the need for the network administrator to manually configure the network. With DCHP, when a client requests an IP address in order to communicate over the network, a DHCP server answers the request by providing network configuration information that was obtained from a database and dynamically assigning an IP address to the client. Each DHCP server manages a range of client addresses and can pick any address from that range as long as it is not being used by a another client managed by that DHCP server. Since the address is dynamically assigned, the client can have a different IP address each time it logs on to the network. Along with the ability to dynamically assign IP addresses, a DHCP server also supports static IP address that have been assigned to one particular client on the network. Based on the configuration information received from the database, the DHCP server can automatically assign a specific IP address to a specific client.

DNS also simplified the management of networks by translating domain names into IP addresses. Since the DNS server contains a list of domain names and their associated IP addresses, a host or client can be located through by its domain name rather than its IP address. Any given domain name could be associated with more than one IP address and any IP address could be associated with more than one domain name. A DNS server updates the domain name and IP address associations by periodically polling a central database containing configuration information for the network. When a new client is assigned an IP address by a DHCP server, the new configuration information is stored in the central database. Each DNS servers on the network poll the central database for configuration changes. If a new IP address was assigned to a client managed by a DNS server, the DNS server updates the domain name with the new IP address or updates the IP address with the new domain name.

In mid-to large-scale networks, a significant number of transmissions between the central database 104 and the DNS servers 102A–N and DHCP servers 103A–N occur. Each DNS server 102A–N and DHCP server 103A–N must individually contact the central database 104 to obtain any configuration changes made to the network that were stored in the central database 104. If there are a large number of DNS servers 102A–N and DHCP servers 103A–N, for example 100, on the network, a bandwidth issue is created at the central database 104.

Therefore, it would be useful to provide an improved means of communicating between a database and one or more servers.

SUMMARY OF THE INVENTION

A method and apparatus for providing information between a central database and at least one server. A server manager is coupled between the central database and the at least one server. The server manager communicates configuration information between the central database and the at least one server in a single communication channel.

Figure 1:
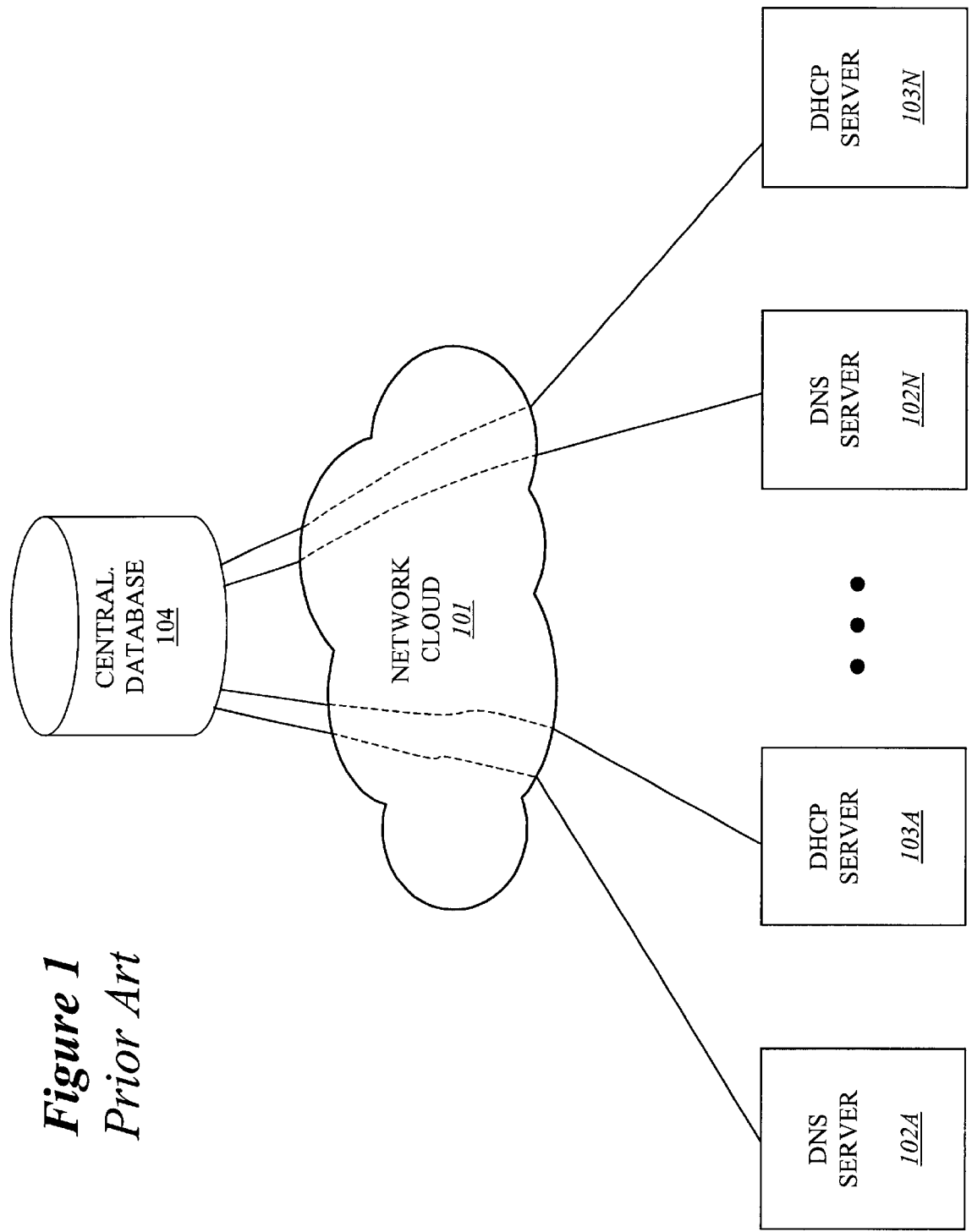
FIG. 1 is an overall diagram of a conventional TCP/IP network.
Figure 3:
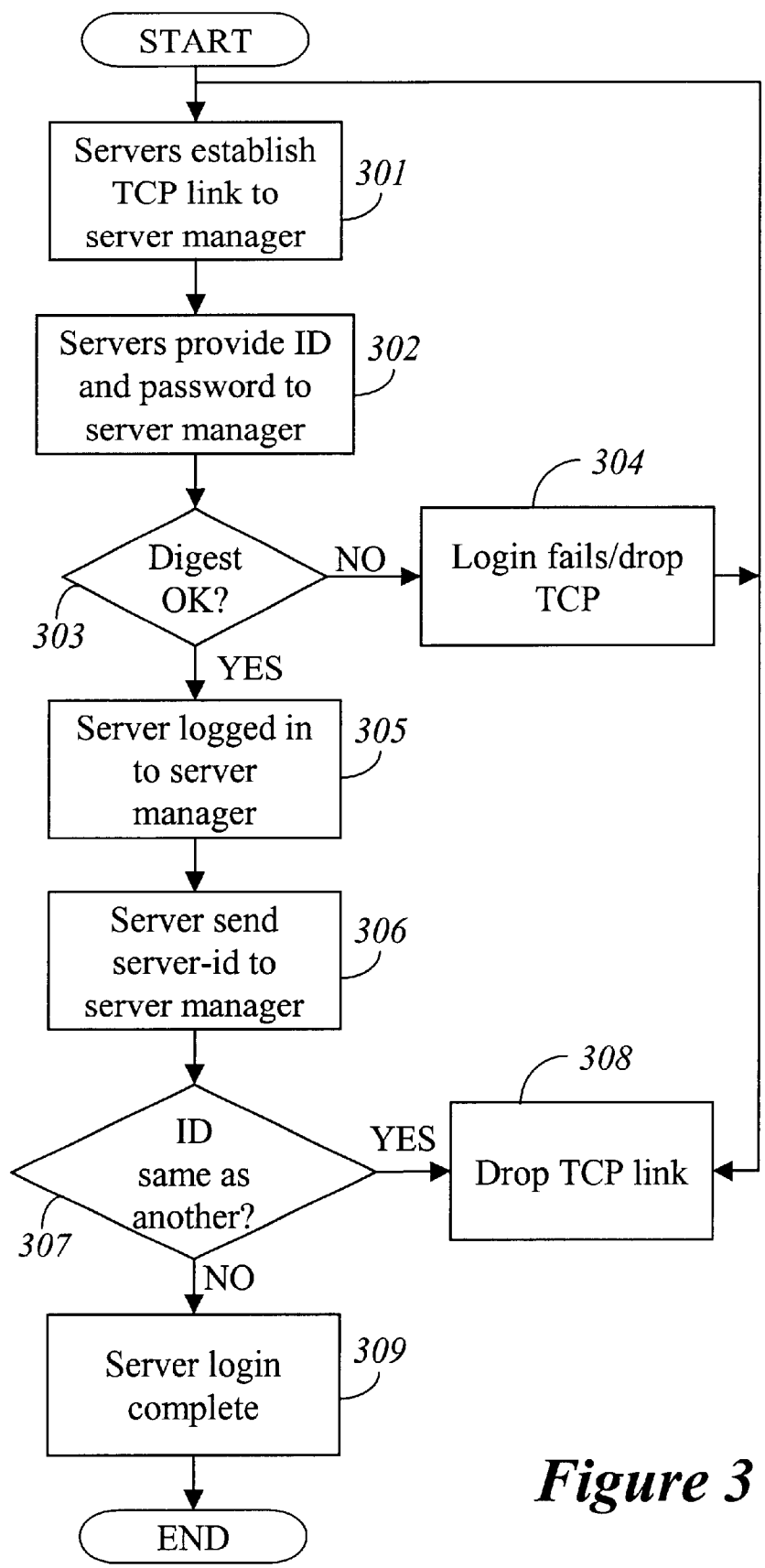
FIG. 3 is a flow diagram illustrating the steps for a server to server manager login process as may be utilized by an embodiment of the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx.

DETAILED DESCRIPTION OF AN EMBODIMENT OF THE PRESENT INVENTION

A method and apparatus for managing IP addressing in a network and effectively synchronizing communication between a central database and one or more servers (such as DNS and DHCP) is described. In one embodiment, a server manager acts as an interface between the one or more servers and the central database. The server manager also synchronizes requests for configuration information and configuration updates from the one or more servers and transmits the requests and updates to the central database through a single communication channel. The server manager then receives the configuration information from the central database and sends the information to that servers that issued the requests. The server manager also transmits the configuration updates from the one or more servers to the central database. Periodically, the server manager polls the central database for any changes in configuration made to the network. If the server manager finds any changes stored in the central database, it transmits the changes to the appropriate servers. The server manager also processes multiple requests at one time and queues up any further requests based on the priority of the work requested or the order in which they were received.

Figure 2A:
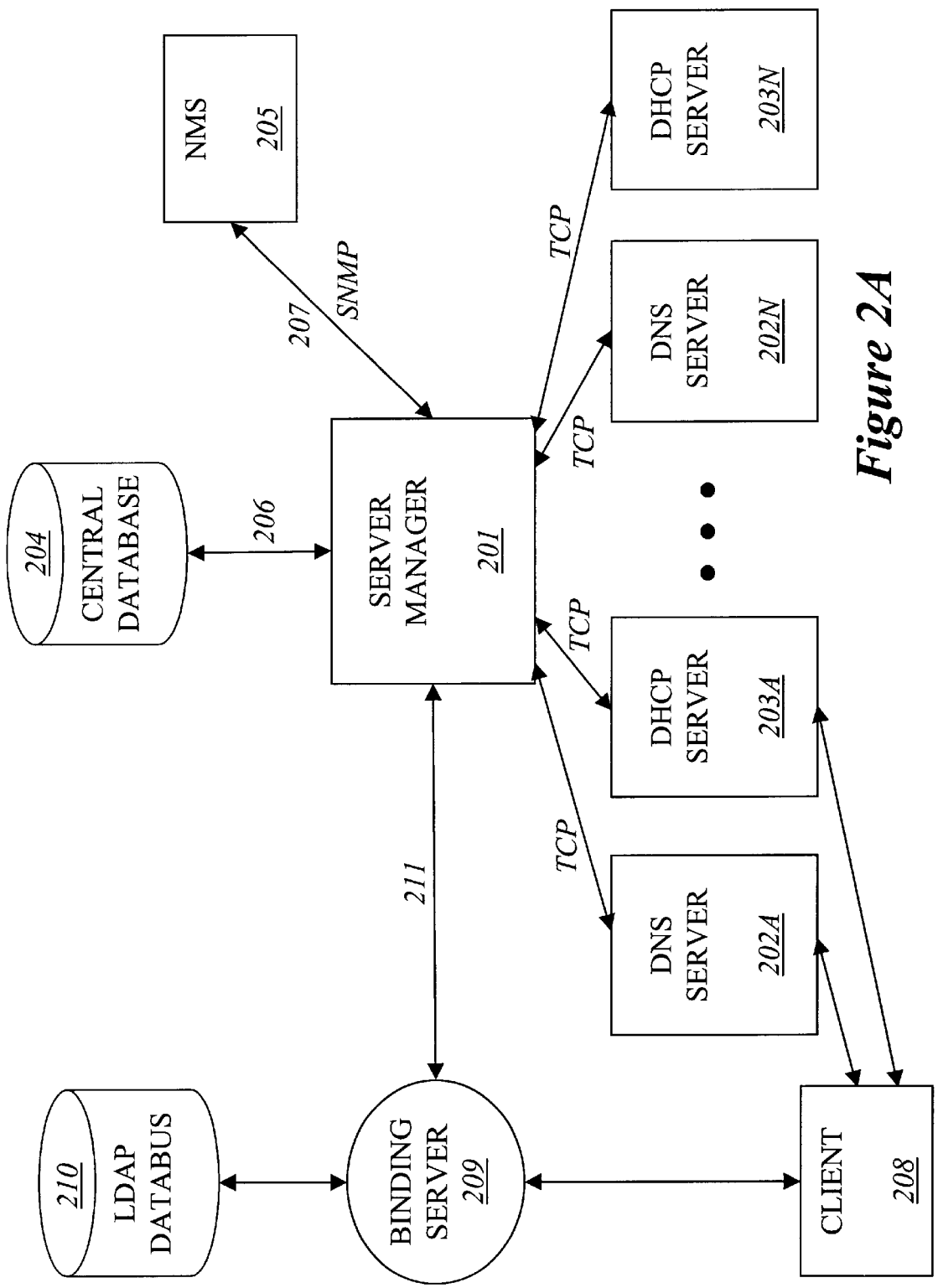
FIG. 2 is an overall diagram of a TCP/IP network as may implement the present invention.
Figure 2B:
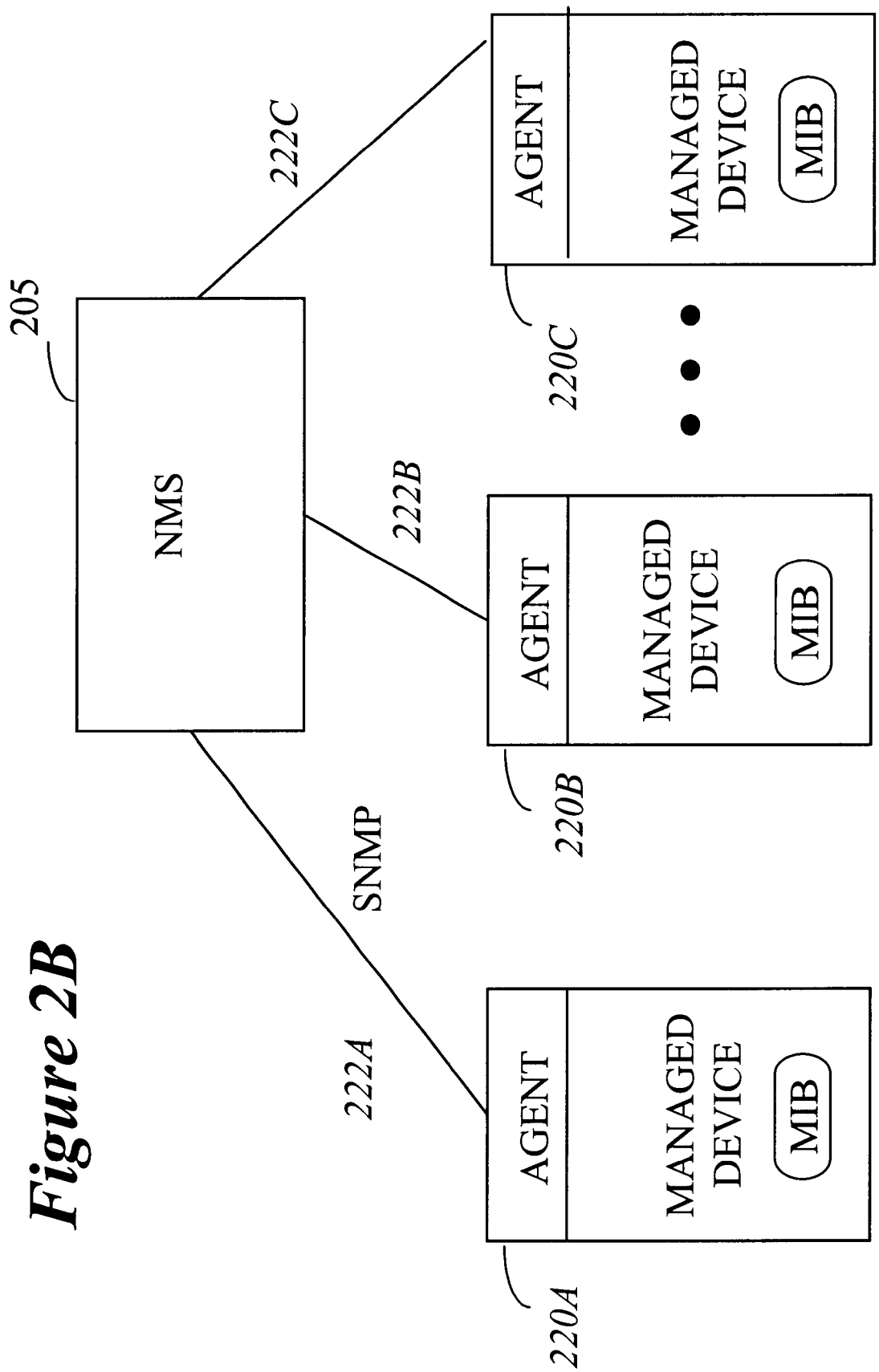

FIG. 2 illustrates a TCP/IP network configured in accordance with the methods and apparatus discussed herein. Although described with reference to certain specific embodiments, those skilled in the art will recognize that the present invention may be practiced without some or all of these details and further, the present invention may be utilized in alternative networks. In one embodiment, the network can contain a plurality of servers that must access the central database in order to obtain configuration information. In order to reduce the number communication channels going to the central database, a server manager can be introduced. The server manager would communicate directly with the plurality of servers and the central database and transmit any requests from the servers to the central database. Therefore, the central database only would need to communicate with the server manager. As will be discussed, this reduces the number of requests which must be managed by the central database. In another embodiment of the invention, dynamic DNS updates are possible and IP addressing is integrated with DNS and DHCP management. All configuration changes, whether made statically, dynamically or at remote locations, are registered in the central database and automatically distributed to the appropriate servers. Also, DHCP redundancy guarantees that a DHCP server is always serving a given range of client addresses. Primary and backup DHCP servers serve the same address range which ensures that DHCP clients in the range can always acquire an IP address. Internet Service Providers (ISP) can benefit from the present invention because management of IP address space is simplified. DHCP servers can act as both DHCP and Bootstrap Protocol (BootP) servers which enables ISPs to integrate the static allocation of IP addresses to cable modems through BootP with the dynamic allocation of IP addresses to end users through DHCP. The present invention also will be of great importance in such applications as Voice/Fax Over IP and Policy-Enabled Networking where a user needs an authenticated address to access network services.

In the described embodiment, the network includes a server manager 201, one or more DNS servers 202A–N, one or more DHCP servers 203A–N, a central database 204, a NMS 205, one or more clients 208, a Lightweight Directory Access Protocol (LDAP) server 209 and a LDAP database 210. The one or more DNS servers 202A–N and DHCP servers 203A–N are coupled in communication with the server manager 201 through individual communication channels. The server manager 201 is coupled in communication with the central database 204 over a single communication channel 206 and the NMS 205 over a single communication channel 207. The LDAP server 209 is coupled in communication with the server manager 201 over a single communication channel 211. However, in alternative networks, the LDAP server 209 can communicate directly with the central database 204.

The central database 204 may be any number of conventional databases. In the described embodiment, either a Sybase 7.3 or 8.0, available from Sybase, Inc. of Emeryville, Calif. or Oracle 11.x database, available from Oracle Corporation of Redwood Shores, Calif., is utilized to store network configuration information. The configuration information may include DNS and DHCP parameters, other server parameters, IP addresses, domain names, the operational status of servers that have successfully logged in to the network and the like. In the described embodiment, the central database 204 is relational and stores changes in configuration made to the network. Because the central database 204 is relational, it can log any configuration changes in a separate area. For purposes of this disclosure, the section of the central database 204 that contains the log of changes in configuration will be referred to as the delta-logging facility. Since changes in configuration in the network are stored in the delta-logging facility, audit records can be kept accurately and the server manager 201 can restore the central database 204 to a previously known state. For example, if the central database becomes corrupted, the server manager can search the delta logging facility for the configuration information of a previously known uncorrupted state.

In the described embodiment, the one or more DNS servers 202A–N are Berkeley Internet Name Domain (BIND) 4.9.5 DNS servers, BIND 8.1.1 DNS servers or the like. These servers 202A–N communicate with the central database 204 through the server manager 201. Each DNS server is coupled to the server manager 201 through a TCP link. The TCP links from the servers 202A–N to the server manager 201 enable dynamic DNS updates and dynamic DNS reconfiguration. In the described embodiment, the one or more DHCP servers 203A–N are based on the BootP. These servers 203A–N also communicate with the server manager 201 through a TCP link and update the central database 204 with changes in DHCP configuration. The ability of the DHCP servers to update the central database with configuration changes enables incremental synchronization of DNS and DHCP services. The servers that can be linked to the server manager are not limited to DNS and DHCP servers. For example, a similar configuration could be used to support Remote Access Dial In User Services (RADIUS), Policy and future servers through the use of protocol server plug-in technology.

The server manager 201, DNS 202A–N and DHCP 203A–N servers described in the embodiment may, for example, run on the operating systems and hardware platforms given in Table 1.

TABLE 1

| Operating System | Minimum Processor | Minimum Memory |
| --- | --- | --- |
| Solaris 2.5, 2.6 | Sun Sparc 20 | 64 Mb |
| HP - UX 10.x | Hewlett Packard 600 | 64 Mb |
| Windows NT 4.0 | Pentium 166 | 64 Mb |

In the described embodiment, the DNS servers 202A–N and DHCP servers 203A–N must first login with the server manager 201. If the login process is successful, the servers 202A–N, 203A–N must set their server id in able to issue command and requests to the server manager 201 for processing. The following sections describe how the servers 202A–N, 203A–N complete the login process and how they communicate with the server manager 201. It should be appreciated that the methods described can be performed in other ways without departure from the scope of the present invention.

FIG. 3 provides a flow diagram illustrating steps utilized in the described embodiment for a server to server manager login process. The login process is not unique to one type of server and can be used by any server attempting to establish a communication channel with the server manger 201. First, the one or more DNS servers 202A–N and DHCP servers 203A–N establish a TCP link to the server manager 201, step 301. Next, each server 202A–N, 203A–N issues a login request by providing a userid and a password to the server manager 201, step 302. The password for each server 202A–N, 203A–N is only known by each individual server and the server manager 201. The server manager 201 validates the userid and password by using MD5, which is described in detail in Rivest, R., "The MD5 Message-Digest Algorithm," Networking Group Request For Comments (RFC) 1331, April 1992, to compute a digest value, step 303. If the password is correct, the server, for example a DNS server 202A, is logged in to the server manager 201, step 305. If the password is incorrect, the login fails and the server manager 201 drops the TCP link, step 304. In order to retry the login sequence, the server 202A must reinitiate a TCP link to the server manager 201 and start the login process from the beginning, step 301.

After logging in with the server manager 201, each DNS server 202A–N and DHCP server 203A–N must set their server-id, step 306. Each server-id is checked against all of the DNS and DHCP servers already coupled in communication with the server manager 201, step 307. If the server-id is the same as a server-id for a server already on the network, the TCP link for the requesting server will be dropped, step 308. If the server-id is unique to that server, the login process is complete, step 309.

Once the DNS servers 202A–N and DHCP servers 203A–N establish a link with the server manager 201, the servers can issue requests for configuration information from the central database 204 or send updated configuration information to the central database 204. The server manager 201 synchronizes all of the requests and updates from the servers and transmits them to the central database 204. The server manager 201 monitors all the DNS servers 202A–N and DHCP servers 203A–N on the network from a single point and acts as a single pipeline to the central database 204. For example, when a new client 208 sends a request for an IP address to a DHCP server 203A, the DHCP server 203A determines if it can send configuration information to the requesting client 208. If the DHCP server 203A can give an IP address and configuration information to the client 208, it sends host configuration information and an IP address to the client 208. The DHCP server 203A automatically registers the new domain name, the IP address and the host configuration information with the central database 204 through the server manager 201. The DNS server 202A detects the new IP address through the server manager and updates its DNS information. When the lease expires or the client 208 leaves the network and releases the IP address, the DHCP server 203A notifies the central database 204 of the change through the server manager 201. The IP address is available for reassignment by the DHCP server 203A to a new client. Therefore, the server manager 201 eliminates the need for the individual DNS servers 202A–N and DHCP servers 203A–N to establish direct communication channels with the central database by providing access to the central database 204 through one communication channel 206.

Advantageously, the described embodiment utilizes plug-in technology in order to allow support for current as well as future generation servers. The DHCP server plug-in has three functions: (1) Provides configuration information to the DHCP servers linked to the network: (2) Informs the DHCP servers of any relevant changes in the central database; and (3) Transacts the DHCP hosts into the central database.

Figure 4:
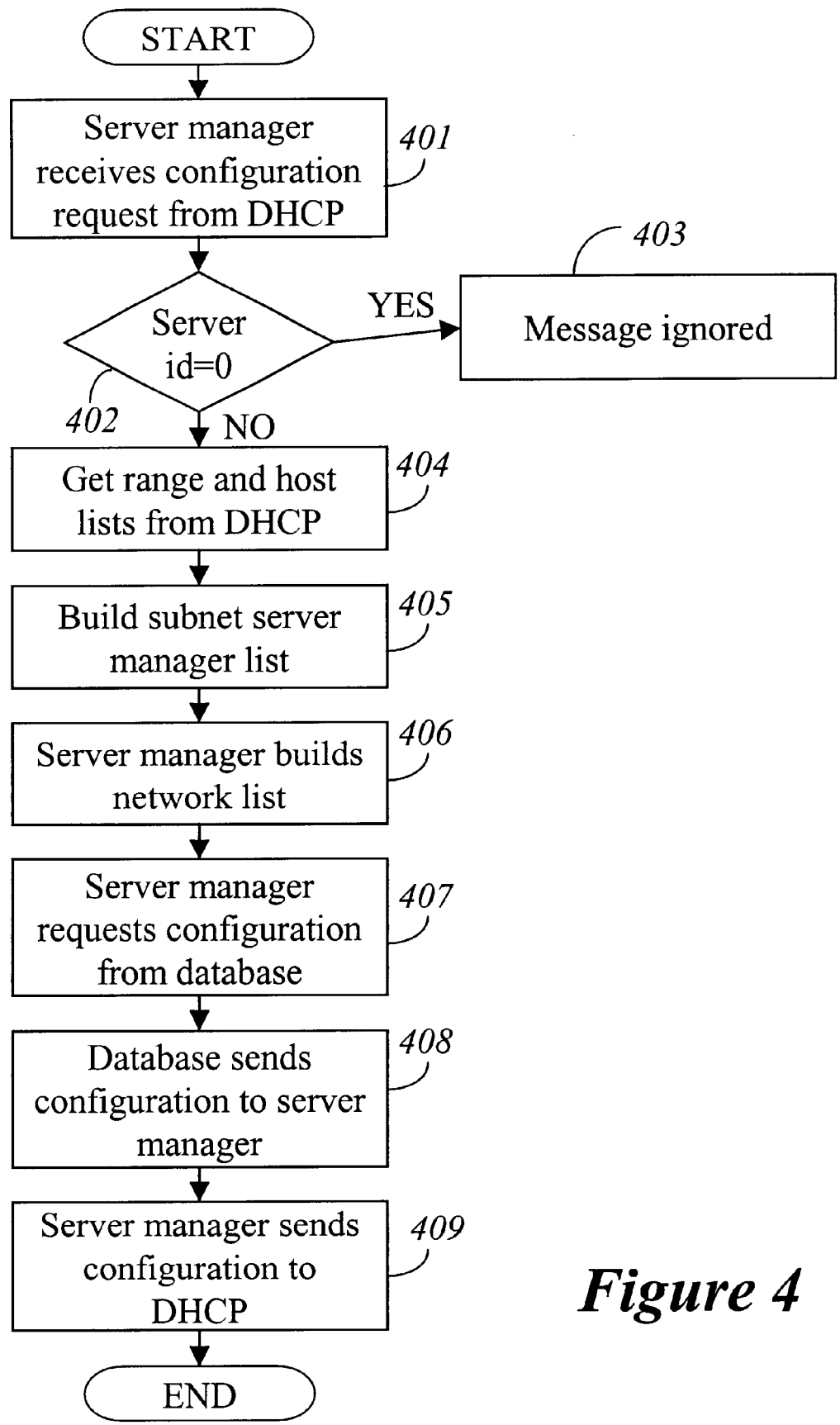
FIG. 4 is a flow diagram illustrating a method for communicating configuration information from the central database to a DHCP server through the server manager as may be utilized by an embodiment of the present invention.

FIG. 4 provides a flow diagram which is useful for describing a method of the described embodiment for transmitting configuration information from the central database 204 to a DHCP server 203A. When the server manger 201 receives a request for configuration information from a DHCP server 203A, step 401, it checks to see if the server-id is zero, step 402. If the server-id is zero, the message is ignored, step 403. Otherwise, the server manager 201 initiates a process to retrieve configuration information from the central database 204. The server manager 201 first receives information, such as range and host lists, from the DHCP server 203A, step 404. It then builds a subnet list associated with the DHCP server 203A based on the range and host lists, step 405. Finally, it builds a network list associated with the DHCP server 203A based on the subnet list, step 406. The server manager 201 then requests the configuration information from the central database 204 based on the lists provided by the DHCP server 203A and the lists it created, step 407. The central database 204 transmits configuration information requested by the server manager 201, step 408, and this information is sent to the DHCP server 203A requesting the configuration information, step 409. In one embodiment, the configuration information can consist of (1) the global options for the network, which is sent to the requesting server and the backup server serving the same address ranges, if DHCP redundancy is supported, (2) the network options for each network contained in the network list that was created by the server manager, (3) the subnet options for each subnet contained in the subnet list, (4) the range options for each range contained in the range list and (5) the host options for each host contained in the host list. A benefit of processing all requests for configuration information from the central database 204 by the DHCP servers 203A–N in the server manager 201 is that the load on the central database 204 is reduced. The server manager 204 eliminates the active link between every DHCP server 203A–N that needs configuration information from the central database 204.

Figure 5:
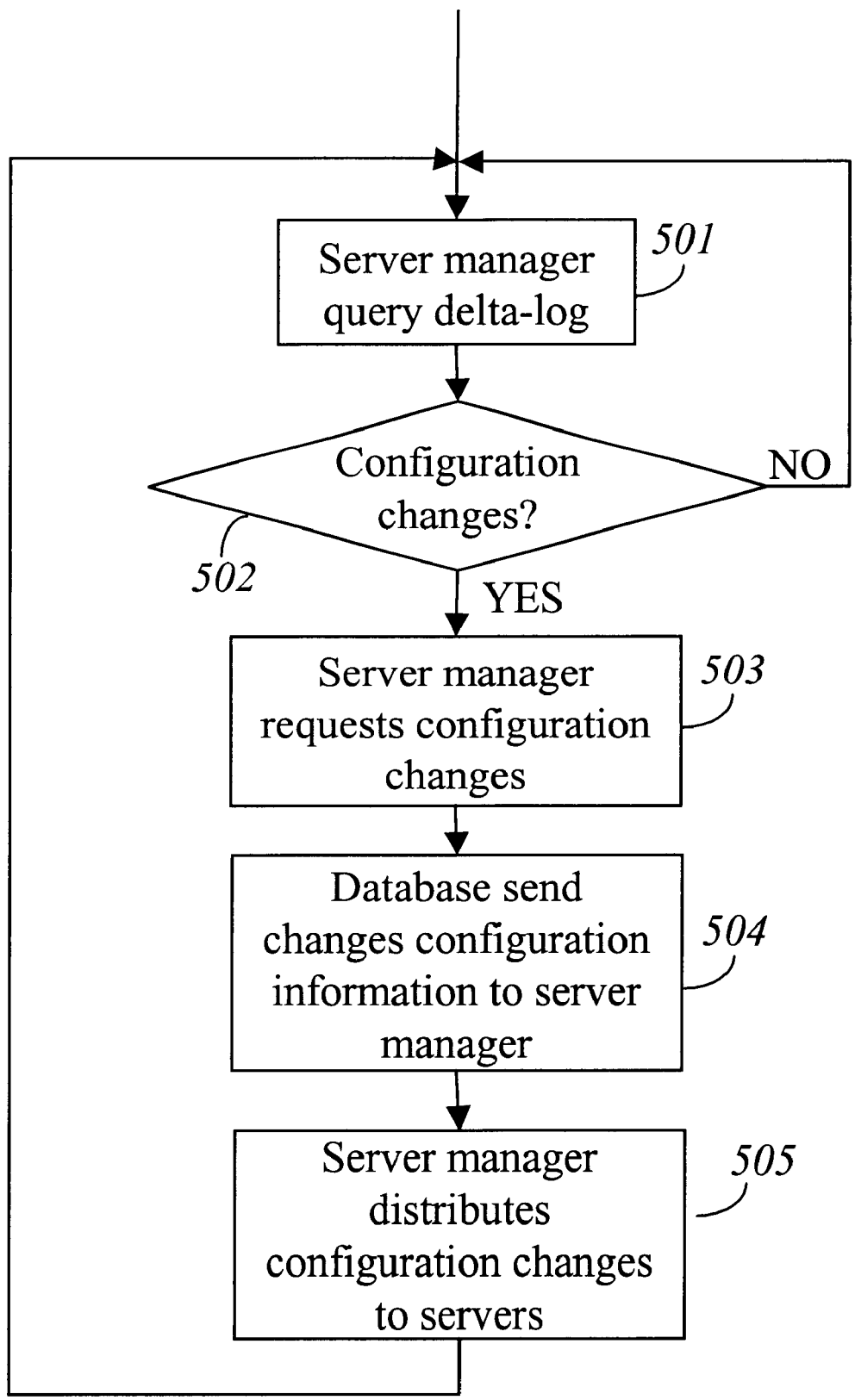
FIG. 5 is a flow diagram illustrating a method for communicating configuration updates from the central database to a DNS server as may be utilized by an embodiment of the present invention.

The server manager 201 also notifies each DHCP server 203A–N of any changes to the central database 201. Once the DHCP servers 203A–N have logged in with the server manager 201, the server manager 201 polls the delta-logging facility in the central database 204 for configuration changes made to the network that would effect the DHCP servers 203A–N coupled in communication with the server manager 201. The interval in between polling can be either a default value or a value set by a user such as the network administrator. In the described embodiment, the interval between each time the server manager 201 polls the central database 204 for configuration changes is 60 seconds. FIG. 5 provides a flow diagram which illustrates a method of the described embodiment for retrieving any changes in configuration made to the network from the delta-logging facility in the central database 204 and transmitting them to the DHCP 203A–N servers coupled in communication with the server manager 201. Once at least one of the DHCP servers 203A–N is communicating with the server manager 201, the server manager 201 queries the delta-logging facility in the central database 204, step 501, to determine if there were any configuration changes, step 502. If there were changes in configuration, the server manager 201 issues a request to the central database 204 for the global range information, the network information, the global client pool and each client pool and client pool entry managed by the DHCP servers 203A–N, step 503. Depending on what configuration changes occurred in the network, the server manager 201 retrieves the appropriate information, step 504 and distributes it to the appropriate DHCP 203A–N servers step 505. If the server manager 201 finds no changes or has completed distributing the changes to the DHCP server 203A–N, it waits the set interval of time and polls the delta-logging facility again for changes, step 501. A benefit of only allowing the server manger 201 to pool the delta-logging facility for changes in configuration is that the load on the network is reduced. The reduced load and reduced amount of traffic to the database increases the overall performance of the network because the server manager 201 automatically determines which DHCP servers 203A–N are effected by the changes. This eliminates update requests from DHCP servers that are not affected by the configuration changes made to the network.

The server manager 201 also processes host commit requests from DHCP servers 203A–N. In order to add host information to the central database 204, the server manager 201 must determine if the domain name is available, unavailable, moving from another host or being updated. Upon receiving a request from a DHCP server 203A to add a host, the server manager 201 first checks if the domain is a Canonical Name (CNAME) or primary name. If the domain is a CNAME, it fails validation and the server manager 201 notifies the DHCP server 203A that the domain is unavailable. If the domain does not exist in the central database 204, the label may be assigned to the host and the server manager 201 notifies the DHCP server 203A that the domain is available. If the client-id of the host requesting the label is the same as the client-id of the host in the central database 204 that owns the label, the label may be assigned to the requesting host and the server manager notifies the DHCP server 203A that the domain is available. If the host in the central database 204 is static, the label can't be used and the server manager 201 notifies the DHCP server 203A that the domain is unavailable. If the IP addresses match, the label is updated and the server manager 201 notifies the DHCP server 203A that the domain has been updated. If the IP addresses do not match, the label is moved to the requesting host and the server manager 201 notifies the DHCP server 203A that the domain has been moved. If the client-id of the host requesting the label is not the same as the client-id of the host in the central database that owns the label, the label is in use and may not be assigned to the host. The server manager 201 notifies the DHCP server 203A that the domain is unavailable. If the server manager 201 determines that the domain name is available, the server manager adds the new host to the network by (1) setting the host IP address; (2) assigning a client-id to the host; (3) setting the hardware address; (4) setting the DHCP server-id; (5) assigning a lease expire time; and (7) determining a domain name. The server manager 201 will then validate all of the above information. If the validation fails, the server manager 201 notifies the DHCP server 203A that the host commit failed, otherwise the server manager 201 notifies the DHCP server 203A that the host has been committed and transmits the host information to the central database 204.

Figure 6:
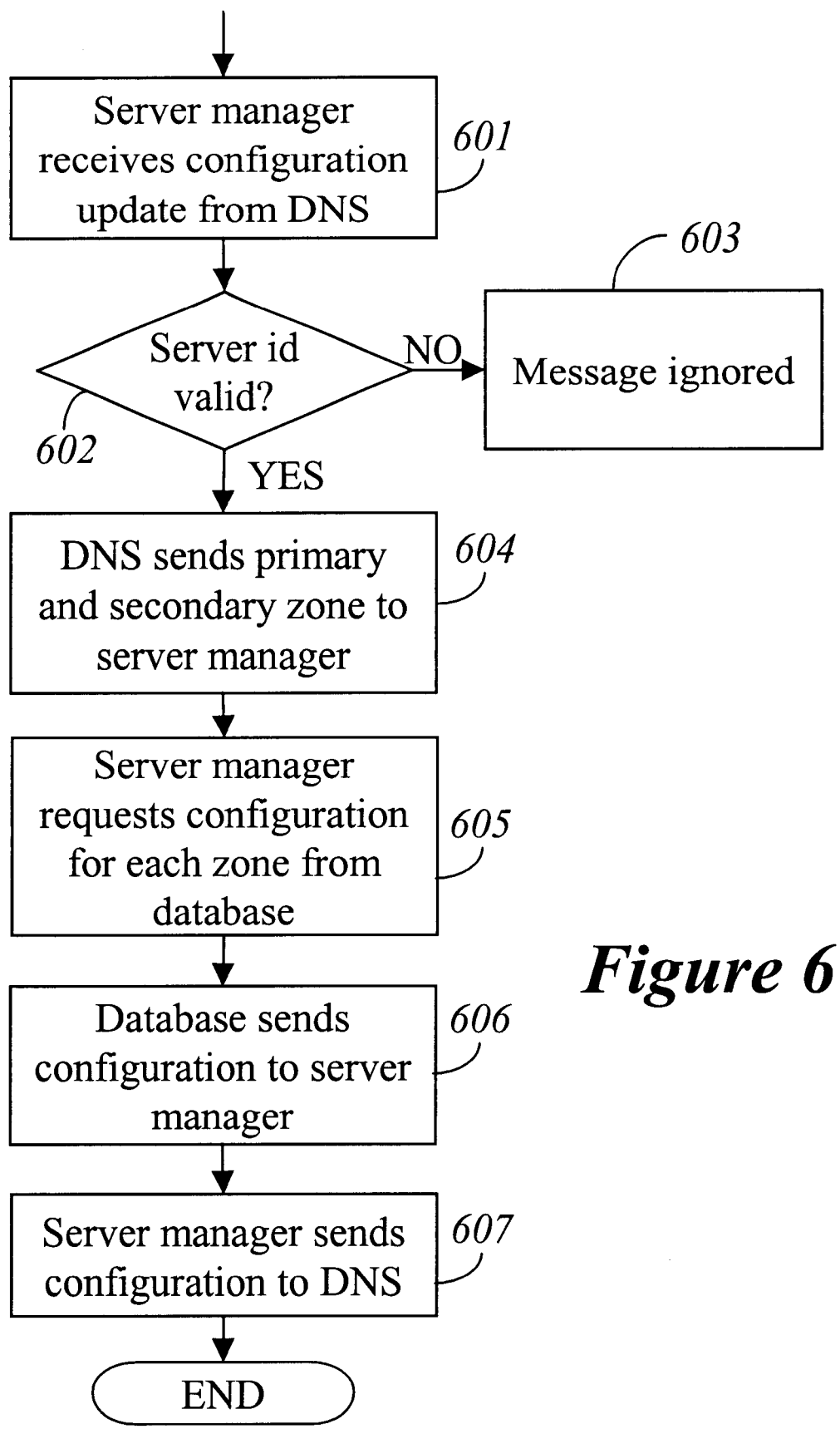
FIG. 6 is a flow diagram illustrating a method for retrieving any configuration changes in the network from the delta-logging facility in the central database and transmitting them to the servers on the network as may be utilized by an embodiment of the present invention.

The DNS server's plug-in has two functions: (1) Provides format configuration information to the both the BIND 4.9.5 DNS servers and the BIND 8.1.1 DNS servers; and (2) Informs them of the relevant changes in the central database. FIG. 6 provides a flow diagram which is useful for describing a method of the described embodiment for communicating configuration updates from the central database 201 to a DNS server 202A. When the server manager 201 receives a configuration update message from a DNS server 202A, step 601, it checks to see if the server id is valid, step 602. If the server-id is NULL, the message is ignored, step 603. However, if the server id is a valid domain name and the version number is valid, the server manager 201 receives the primary and secondary zones managed by the DNS server 202A, step 604. The server manager 201 then issues a configuration update request for each zone managed by the DNS server 202A to the central database 204, step 605. The central database 204 transmits the configuration information for each zone to the sever manager 201, step 606. The server manager 201 then transmits the updated configuration information to the DNS server, step 607. For each primary forward zone, the server manger 201 sends the Start of Authority (SOA) record, name servers of the zone, the A record, RR record, option record, CNAME record and the glue record with the subzones to the DNS server 202A. For each primary reverse zone, the server manager 201 sends the SOA record, name servers of the zone, the PTR record for each subdomain of the zone and the glue record with the subzones to the DNS server 202A. For each secondary zone, the server manager 201 sends that zone transfer list to the DNS server 202A. Finally, the server manager 201 sends information about the root server on the network to the DNS server 202A.

The server manager 201 also polls the delta-logging facility in the central database 204 periodically to determine if there were any changes in configuration made to the network that would effect the DNS servers 202A–N. The process of polling the delta-logging facility in the central database 204 for the DNS servers 202A–N is similar to the process previously described in FIG. 5 for the DHCP servers 203A–N. However, the server manager 201 requests the primary and secondary zone information, the primary forward and reverse zone information, the subzone information for each subzone not managed by a DNS server and the subdomain of one of the primary zones managed by the DNS server. Once the server manager 201 retrieves this information, it transmits the relevant information to the appropriate DNS servers 203A–N. This method has a similar benefit, as described above in the DHCP section, in that DNS servers that are not effected by the configuration changes will not be polling the central database 204 for changes since the only server manager 201 is coupled in communication with the central database 204.

The server manager 201 can process multiple requests or commands at the same time. However, the number of requests or updates that the server manager 201 can process at the same time is determined by the machine that it is running on. Therefore, the server manager 201, as used by the described embodiment, prioritizes what it processes based on the type of work requested. The server manager 201 services the requests and updates in the following order: (1) get configuration requests from the DCHP servers; (2) polling the central database for any configuration changes in the network; (3) configuration update requests from the DNS servers; and (4) removing leases for IP addresses when they expire. Prioritizing based on the type of work requested is not the only method available for the server manager 201 to process information. It could also process the information based on a first-in first-out method. For example, the first request or packet of information received by the server manager 201 would be processed first and the last request or packet of information received by the server would be processed last.

Figure 7:
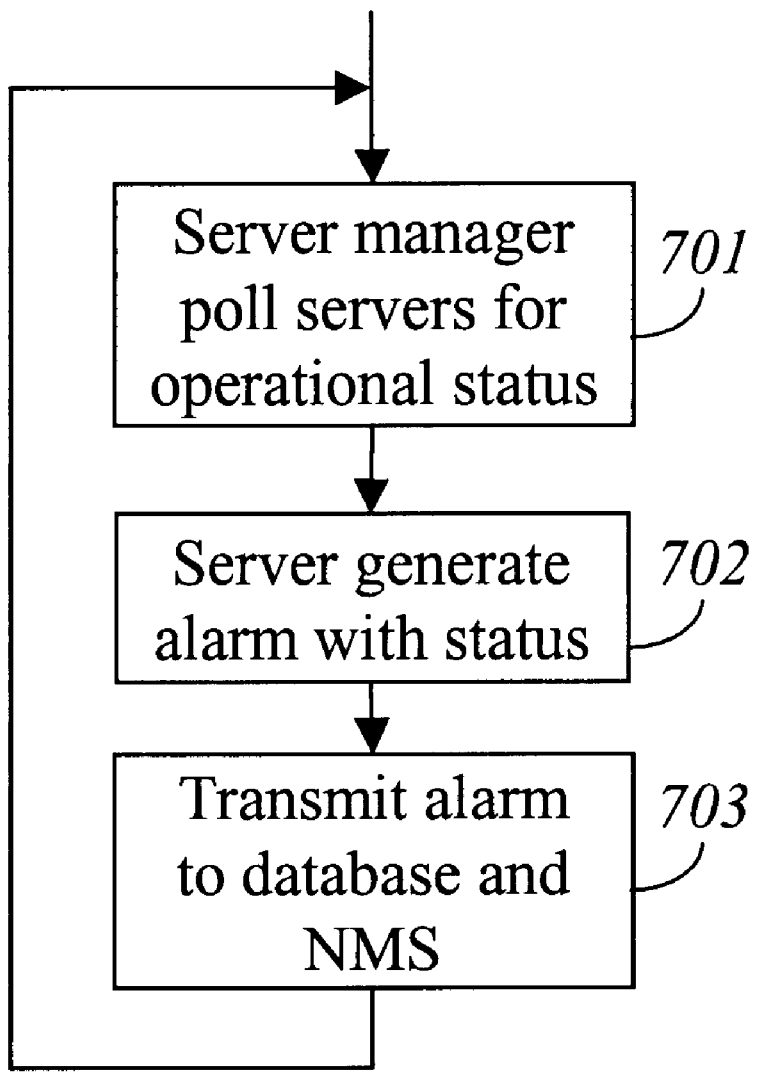
FIG. 7 is a flow diagram illustrating a method for determining the operational status of the DNS and DHCP servers on the network and transmitting the status information to the NMS as may be utilized by an embodiment of the present invention.

The server manager 201 also has the ability to actively manage the DNS 202A to 202N and DHCP 203A–N servers and report their operational status to the NMS 205. In the described embodiment, the NMS 205 communicates with an agent, e.g., any of $220_A$, $220_B$, ... $220_C$ (See FIG. 2B), the server manager 201 (See FIG. 2A), to keep track of the network statistics and resources. Network administrators can use the NMS 205 to view the real-time operating status of the DNS 202A–N and DHCP 203A–N servers that are linked with the server manager 201. In one embodiment, the NMS 205 could be a graphical user interface (GUI) running on a powerful computer such as a workstation. FIG. 7 provides a flow diagram which illustrates a method of the described embodiment for determining the operational status of the DNS 202A–N and DHCP 203A–N servers on the network and transmitting the status information to the NMS 205. The server manager 201 polls the servers every 40 seconds to determine if the server is still running or if it has stopped, step 701. The server generates an alarm or warning to indicate its operating status and communicates the message to the server manager 201, step 702. The message could contain information such as a key word to trigger the correct plug-in, the severity of the alarm, the specific server-id, and an alarm code to indicate the problem. The server manager 201 queues up the reports from the servers along with any other requests that it receives and attaches a database time stamp to each one. The server manager 201 then communicates the alarms to the central database 204 and to the NMS 205, step 703. The alarms are sent to the NMS 205 through a Simple Network Management Protocol (SNMP) trap e.g. $222_A$, $222_B$, ... $222_C$ (See FIG. 2B). The traps could contain information such as setting the server status to up when the server successfully establishes a TCP link with the server manager 201, setting the server status to down when the TCP link between the server and the server manager is dropped and setting the server status to failed login when the server successfully establishes a TCP link with the server manager 201 but tried an invalid login. These traps can then be viewed from the GUI by the network administrator. The advantage to using the server manager 201 for active server management is that the server manager 201 can detect when a server has crashed. In some embodiments, multiple servers are running on the same hardware. If the hardware is still running but one of the servers has crashed, the server manager 201 can detect the change through the TCP link which will be dropped if the server crashes. When the TCP link is started or dropped, the server manager 201 generates an exception, such as the described SNMP traps $222_A$ $222_B$ $222_C$, to the NMS 205. Therefore, the network administrator is able to determine if a server has gone down if the hardware is still operational.

Figure 8:
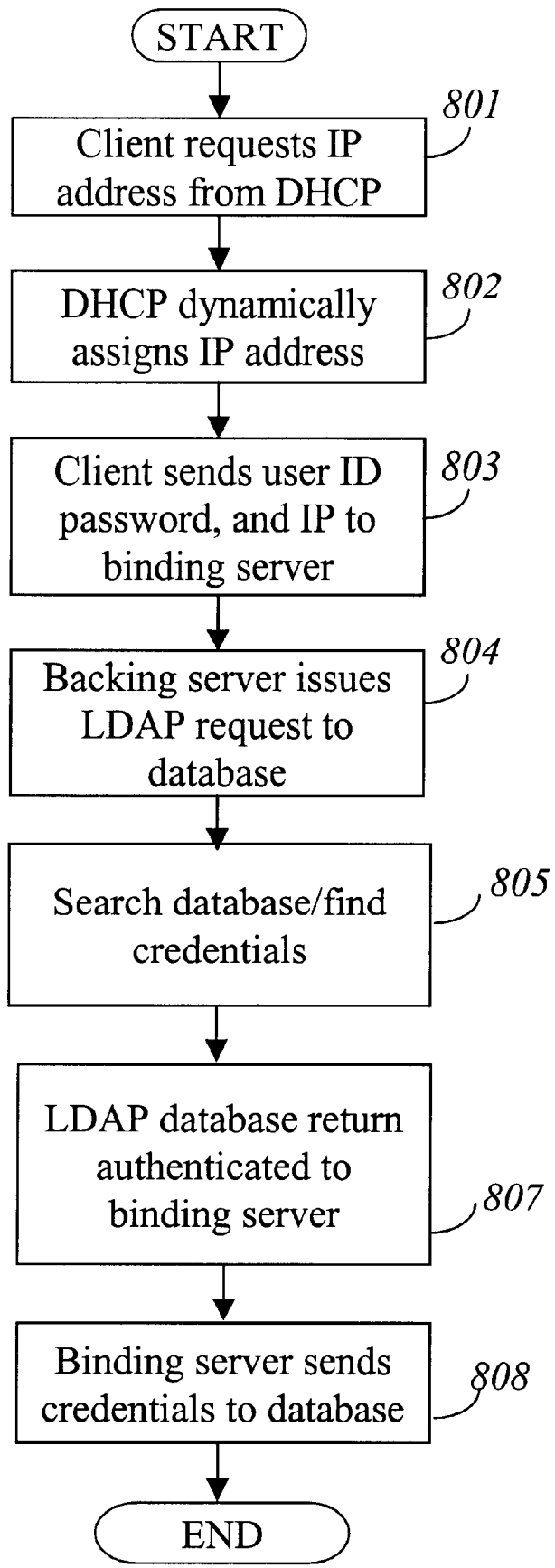
FIG. 8 is a flow diagram illustrating a method for authenticating a user and binding the user to the IP address dynamically assigned to it by a DHCP server as may be utilized by an embodiment of the present invention.

The present invention also allows a user to be authenticated and binds the user to the IP address that was given to it by the DHCP server on the network. FIG. 8 provides a flow diagram which illustrates a method of the described embodiment for authenticating a user and binding the user to their current address. First a client 208 requests an IP address from the DHCP server 203N on the network, step 801. The DHCP server 203N dynamically assigns the client 208 an IP address before it has been authenticated, step 802. The client 208 then issues a registration request with the binding server 209 and communicates its userid, password and the IP address it just obtained from the DHCP server 203N to the binding server 209, step 803. The method of communication used by the client in the described embodiment is the Hyper Text Transfer Protocol (HTP) but alternative methods can be used. Currently the client does not provide itself with a userid or password. However, two examples of methods for the client to obtain its userid and password are to have the user go to a World Wide Web (WWW) page or download a Java applet to obtain information from a PC or workstation which could modify the operating system to automatically provide it. The binding server 209 then authenticates the userid, password and IP address through an LDAP request to the LDAP database 210, step 804. The LDAP request searches the LDAP database 210 for the userid, password and the possible IP addresses that the DHCP server 203N could assign, step 805. The LDAP database 210 is organized in a tree hierarchy. For example, the root of an Internet address is at the top and the common name associated with the user is at the bottom. The LDAP database 210 is accessible through an open, standards based protocol such as TCP. If the information is found in the LDAP database 210, it notifies the binding server 209 that the user credentials were verified by returning the authenticated credentials, step 807. The binding server 209 then sends the authenticated credentials to be stored in the central database 204, step 808. In the described embodiment, the binding server 209 communicates with the server manager 201 over a single channel 211 to store the credentials in the central database 204. However, the binding server 209 could also communicate directly or through some other device with the central database 204 in order to store the authenticated credentials.

The present invention as utilized in the described embodiment authenticates the actual userid/password and address combination. Applications such as Voice/Fax over IP and Video Conferencing can benefit from the present invention because routing and bandwidth considerations are based on source and destination addresses. Therefore, deciding which users can access the network services requires authenticated addresses.

Thus, method and apparatus for transmitting configuration between a central database and one or more servers through a server manager on a network has been described. Although the present invention has been described with specific reference to a number of details of the preferred embodiment and with reference to FIGS. 1 through 8, it will be apparent to those skilled in the art that a number of modifications and various variations may be employed without departure from the scope and spirit of the present invention.

What is claimed is:

1. A network comprising:
    a Lightweight Directory Access Protocol (LDAP) directory having at least one client credential value with possible IP addresses;
    a binding server coupled to the LDAP directory;
    at least one client coupled to the binding server, the at least one client having a client credential with an unauthenticated IP address;
    wherein the binding server transmits an LDAP request including at least one client credential with said unauthenticated IP address to the LDAP directory, the binding server authenticating the at least one client if said client credential including said unauthenticated IP address matches the at least one client credential value including possible IP addresses.

2. The network as recited by claim 1, further comprising a server coupled to the binding server and the at least one client, the server to dynamically assign said unauthenticated IP address to the at least one client.

3. The network as recited in claim 1, wherein the client credential comprises a client identification.

4. The network as recited in claim 3 wherein the at least one client transmits the client credential as a registration request to the binding server.

5. The network as recited in claim 1, further comprising a central database to store the at least one client credential, wherein said central database is coupled to said binding server.

6. A method for authenticating at least one client in a network comprising:

dynamically assigning an unauthenticated IP address to the at least one client;

receiving a registration request by the at least one client, the registration request including a client credential with said unauthenticated IP address;

comparing the client credential with said unauthenticated IP address to a stored client credential value in a Lightweight Directory Access Protocol (LDAP) directory; and authenticating said at least one client if said client credential matches said client credential value.

7. The method as recited in claim 6 further comprising:

storing said client credential in a central database if said client is authenticated.

* * * * *